US010332020B2

United States Patent
Bai et al.

(10) Patent No.: US 10,332,020 B2
(45) Date of Patent: Jun. 25, 2019

(54) METHOD AND APPARATUS OF DIFFERENTIATING DRIVERS BASED ON DRIVING BEHAVIORS

(71) Applicants: GM GLOBAL TECHNOLOGY OPERATIONS LLC, Detroit, MI (US); RUTGERS, THE STATE UNIVERSITY OF NEW JERSEY, New Brunswick, NJ (US)

(72) Inventors: Fan Bai, Ann Arbor, MI (US); Gorkem Kar, Piscataway, NJ (US); Douglas C. Martin, Oxford, MI (US); Donald K. Grimm, Utica, MI (US); Marco Gruteser, Princeton, NJ (US)

(73) Assignees: GM GLOBAL TECHNOLOGY OPERATIONS LLC, Detroit, MI (US); RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 131 days.

(21) Appl. No.: 15/284,187

(22) Filed: Oct. 3, 2016

(65) Prior Publication Data
US 2017/0147935 A1    May 25, 2017

Related U.S. Application Data

(60) Provisional application No. 62/257,565, filed on Nov. 19, 2015.

(51) Int. Cl.
*G06N 7/00* (2006.01)
*G07C 5/02* (2006.01)
*G06F 16/28* (2019.01)
*G06N 20/00* (2019.01)
*B60R 16/037* (2006.01)
*G01M 17/007* (2006.01)

(52) U.S. Cl.
CPC ........... *G06N 7/005* (2013.01); *B60R 16/037* (2013.01); *G01M 17/007* (2013.01); *G06F 16/285* (2019.01); *G06N 20/00* (2019.01); *G07C 5/02* (2013.01)

(58) Field of Classification Search
CPC ..................................................... G06N 7/005
See application file for complete search history.

(56) References Cited

U.S. PATENT DOCUMENTS

2013/0041521 A1*  2/2013  Basir ...................... B60R 25/33
                                                    701/1
2016/0086397 A1*  3/2016  Phillips ................ G07C 5/0808
                                                    701/32.4

\* cited by examiner

*Primary Examiner* — Manuel A Rivera Vargas
(74) *Attorney, Agent, or Firm* — Cantor Colburn LLP (57) ABSTRACT

A system and method for identifying a vehicle driver based on driver behaviors. The system and method include analyzing a sequence of vehicle start-up behaviors for rapid identification of the driver. The start-up analysis includes detecting and evaluating the sequence and timing of events including door opening, door closing, seat belt fastening, ignition switch usage and shift/drive, among others. The technique further includes analyzing a set of longitudinal (or long-term) behaviors for more robust verification of driver identification. The longitudinal behaviors include acceleration and braking patterns, speed pattern (compared to road type and speed limit), stop sign behavior, cruise control usage and many others. Statistical clustering techniques are employed for both the start-up and longitudinal behavior analyses to identify the driver.

15 Claims, 5 Drawing Sheets

METHOD AND APPARATUS OF DIFFERENTIATING DRIVERS BASED ON DRIVING BEHAVIORS

CROSS-REFERENCE TO RELATED APPLICATIONS

This application claims the benefit of the priority date of U.S. Provisional Patent Application Ser. No. 62/257,565, titled, Method and Apparatus of Differentiating Drivers Based on Driving Behaviors, filed Nov. 19, 2015.

BACKGROUND OF THE INVENTION

Field of the Invention

This invention relates generally to a vehicle driver identification system and, more particularly, to a system and method for identifying a vehicle driver based on driver behaviors, including analyzing a sequence of vehicle start-up behaviors for rapid driver identification, and analyzing a set of longitudinal behaviors for more robust verification of driver identification.

Description of the Related Art

The number of configurable and customizable systems in vehicles has increased dramatically in recent years. From adjustable seats, mirrors and pedals to infotainment and climate control systems, the amount of driver-specific customization of systems in some vehicles is now staggering. These systems—when their configurations and customizations are optimized for the driver—not only provide greater comfort and convenience for the driver, but also contributed to driver attentiveness and performance improvement. This is the result of minimizing adjustments made by the driver while driving, and of the cockpit controls being physically positioned for optimal driver usage.

Because of the large number and types of system configurations possible, it is more important than ever for a vehicle to accurately identify the driver and automatically configure all systems to suit the driver's preferences. Systems are known in the art which identify a driver based on which key fob she or he is using, or even based on a mobile device (e.g., cell phone) which the driver has on her or his person. However, these device-detection type systems require additional hardware in the vehicle to detect and identify the device. Furthermore, using a key fob for driver identification is notoriously inaccurate due to the fact that people in a family commonly share keys and key fobs. There is a need for a fast, reliable driver identification system which can be implemented in software on the vehicle, in order to overcome the limitations of known systems.

SUMMARY OF THE INVENTION

In accordance with the teachings of the present invention, a system and method are disclosed for identifying a vehicle driver based on driver behaviors. The system and method include analyzing a sequence of vehicle start-up behaviors for rapid identification of the driver. The start-up analysis includes detecting and evaluating the sequence and timing of events including door opening, door closing, seat belt fastening, ignition switch usage and shift/drive, among others. The technique further includes analyzing a set of longitudinal (or long-term) behaviors for more robust verification of driver identification. The longitudinal behaviors include acceleration and braking patterns, speed pattern (compared to road type and speed limit), stop sign behavior, cruise control usage and many others. Statistical clustering techniques are employed for both the start-up and longitudinal behavior analyses to identify the driver.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for differentiating drivers based on driver behavior data is merely exemplary in nature, and is in no way intended to limit the invention or its applications or uses.

Driver identification systems are known in the art which attempt to identify a driver of a vehicle by detecting an object which the driver has on his or her person—typically a key fob or a cell phone. These known systems require specially configured detection hardware in the vehicle, and are prone to misidentification of the driver due to the simple fact that, for example, multiple members of a family may share the same vehicle keys and key fob. A more robust driver identification system, which requires only software in addition to sensors which already exist on a vehicle, is disclosed below.

Figure 1:
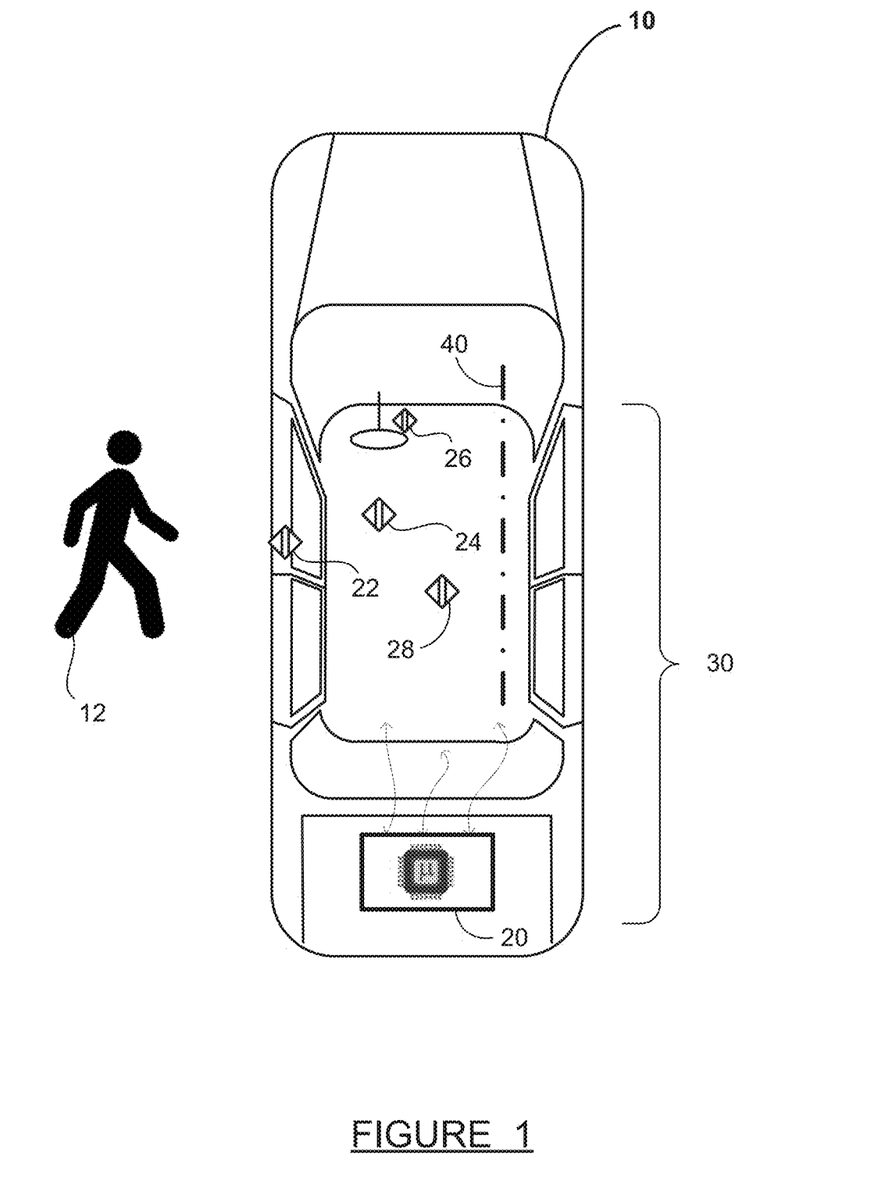
FIG. 1 is an illustration of a vehicle including sensors and a processor configured for identifying a driver through analysis of driver behaviors, according to an embodiment of the invention.

FIG. 1 is an illustration of a vehicle 10 with a system configured for identifying a driver 12 through analysis of driver behaviors, according to an embodiment of the invention. The vehicle 10 includes a processor 20 which communicates with a plurality of sensors, shown as sensors 22, 24, 26 and 28. The processor 20 may be any suitable processor onboard the vehicle 10—such as a processor included in a body systems controller, an infotainment system controller, etc. Communications between the processor 20 and the sensors 22-28 may be hard-wired, multiplexed, data bussed, wireless, or any combination thereof. The processor 20 together with the sensors 22-28 collectively make up a driver identification system 30.

The sensors 22-28 are representative of a wide array of sensors which exist on most modern vehicles. The sensor 22 represents a driver's door open/closed sensor, the sensor 24 represents a driver's seat belt fastening status sensor, and the sensor 26 represents an ignition switch position sensor. The sensor 28 represents many other types of sensors onboard the vehicle 10—including, but not limited to, a vehicle speed sensor, a transmission shift position sensor, lateral, longitudinal and vertical acceleration sensors, throttle position sensor, anti-lock brake system (ABS) activation and wheel speed sensors. The sensor 28 may also represent a camera or an object sensor (such as radar, LiDAR, or ultrasound), for determination of the environment surrounding the vehicle 10. In addition to the aforementioned sensor types, the processor 20 is in communication with a vehicle bus 40, and can obtain data from the bus 40 from vehicle systems such as a climate control system, an infotainment system, a navigation system, an adaptive cruise control system, a lane departure warning or lane keeping assist system, and a collision warning or collision avoidance system. The processor 20 also has access to engine, transmission and steering data via the bus 40. In summary—the processor 20 has access to all data onboard the vehicle 10 as obtained from the sensors 22-28 or via the bus 40.

As will be discussed in detail below, the driver identification system 30 provides many advantages over other known driver identification systems. The system 30 can provide rapid driver identification at the start of a trip in addition to refined driver identification based on longitudinal data, can differentiate both existing users within a given group and total strangers to this group, requires only software in addition to existing vehicle systems, does not add to or modify existing in-vehicle hardware architecture, does not depend on drivers carrying a device (e.g., smartphone), and accuracy is not affected by persons sharing key fobs.

Figure 2:
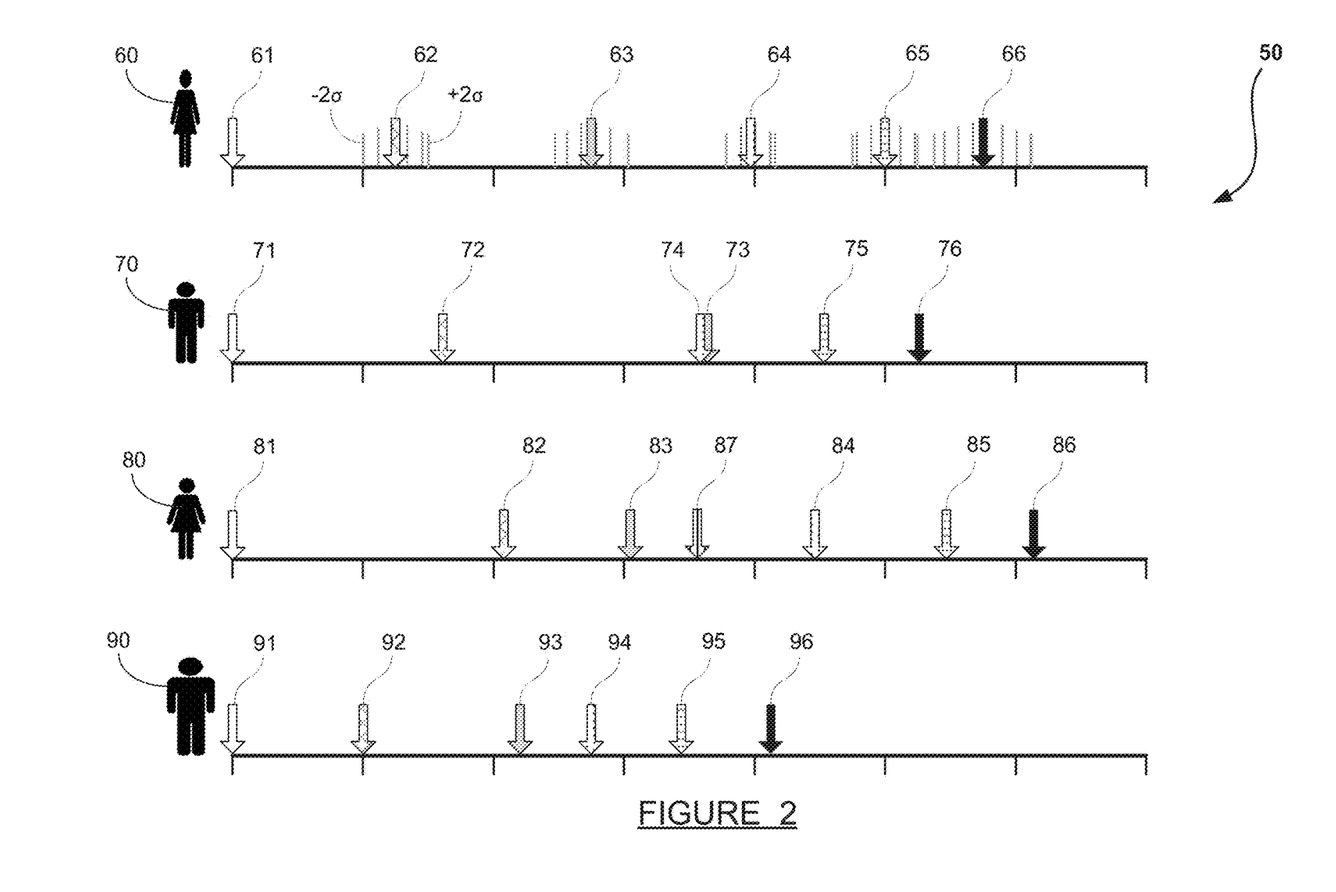
FIG. 2 is a set of timelines illustrating how a sequence and timing of vehicle entry and start-up actions performed by a driver can be used to identify the driver.

FIG. 2 is a set of timelines 50 illustrating how a sequence and timing of vehicle entry and start-up actions performed by a driver can be used to identify the driver. Each of the timelines 50 spans a time of 30 seconds, beginning when a driver opens the door of the vehicle and identifying when each of a sequence of events occurs for the particular driver, with the final event on the timelines being release of brakes (vehicle begins moving). The experimental results show that the vast majority of drivers finish the sequence of vehicle entry and start-up actions within 30 seconds, however, the exact duration different drivers might vary significantly due to their different behaviors and action sequence.

Data is shown on the timelines 50 for four different drivers—identified as drivers 60, 70, 80 and 90. Each of the drivers performed a vehicle entry and start-up sequence multiple times, with the timing of each event recorded, thus yielding statistical data about the event sequence and timing for each driver. This is the data that is shown on the timelines 50.

For example, the driver 60 performed a door opening 61 at time 0.0 (door opening is at time 0.0 for all drivers). The driver 60 then performed a door closing 62 at an average time of about 2.4 seconds, followed by ignition switch usage 63 at an average time of about 5.6 seconds, followed by seat belt fastening 64 at an average time of about 7.9 seconds, followed by transmission shift 65 at an average time of about 10.0 seconds, and release of brakes 66 at an average time of about 11.4 seconds. Each of the events 62-66 is shown on the timeline for the driver 60 with surrounding data bands representing two standard deviations ($2\sigma$) from the mean of each event.

The timeline for the driver 70 includes door opening 71 at time 0.0, and a door closing 72 at a time which is later than the door closing time 62 for the driver 60. The driver 70 then performs ignition switch usage 73 and seat belt fastening 74 at nearly the same time, with the sequence of these two events actually reversed from the other drivers. The driver 70 then proceeds to perform transmission shift 75 and release of brakes 76 at times which are earlier than those for the driver 60. In order to reduce drawing clutter and improve clarity, the $+/-2\sigma$ data bands are not shown on the timelines for the drivers 70/80/90, but this data is captured and used in the analysis discussed below.

The timeline for the driver 80 includes the corresponding events 81-86, shown with the arrows using the same convention as the timelines above. It is noted that the driver 80 takes the longest amount of time from door opening 81 to release of brakes 86. Also, the driver 80, on at least one occasion, performed an additional action which was not performed by the other drivers. Specifically, the driver 80 opened the driver's side window, noted as side window usage 87, after ignition switch usage 83 and before seat belt fastening 84.

The timeline for the driver 90 reveals the shortest amount of time taken for each of the actions 92-96. It is worth repeating that the arrows shown on the timelines 50 represent the average time at which each of the drivers performed each of the actions. After repeating the vehicle start-up sequence a number of times, not only the average but also the statistical distribution of timing for each action is captured for each of the drivers. It has been shown that a driver's behavior patterns can be characterized by measuring about ten vehicle start-up sequences.

The differences between the timing and sequence of vehicle entry and start-up events, clearly visible in the timelines 50, can be mathematically analyzed to identify individual drivers. This is done by using the sensors 22-28 to detect the timing of each of the events beginning with driver's door opening, and correlating the measured start-up sequence with previously measured statistical data for each known driver of the vehicle to identify a match. As explained above, each driver tends to exhibit behavior patterns which are repeatable in a statistically significant way, thus enabling the behavior patterns to be identified as signatures which are characteristic of an individual driver.

Another approach to differentiate drivers could be to use relative time differences between these events. Instead of finding the time difference between each event and the reference event (door opening), the expected events could be sorted in order (door opening, door closing, ignition switch usage, seatbelt fastening, transmission shift and release brake) and then, calculate the relative time difference between each event. In this way, if a driver uses a different sequence in these events (e.g. fastening seatbelt after releasing brake), it becomes easier to distinguish that driver. For people who are familiar with the state of the art in this technical field, it should be understood that other methods of calculating the time sequence or relative time among events also could be supported. The above description is just an illustrative example.

Using the vehicle start-up sequence described above, a determination of driver identity can be made quickly—within about 30 seconds from door opening—that is, shortly after the sequence itself is completed. Longer term driving behaviors can also be used to identify drivers. These longer term driving behaviors—described herein as longitudinal behaviors—examine the driver's driving style on the road, including speed, acceleration and braking tendencies, etc. Although the longitudinal behaviors require more time to identify a driver, they contain a higher dimensionality of measured data and therefore may result in more accurate driver identity determination.

Many parameters can be measured by the sensors 22-28 and/or obtained from the vehicle data bus 40 and used in driver longitudinal behavior analysis. Factors included in the driver longitudinal behavior analysis include, but are not limited to: average speed as a function of road type (where road type can be obtained from the vehicle navigation system); deviation from speed limit; acceleration patterns, including maximum acceleration and number/frequency of accelerations greater than a threshold g-level; braking patterns, including maximum deceleration and number/frequency of decelerations greater than a threshold g-level; stop sign behavior, including whether a complete stop is made, and duration of stop; turn behavior, including speed and lateral acceleration during turns; yield pattern, including tendency to yield to other drivers or assert the right of way; cruise control usage pattern—including whether cruise control is used on highways, on other roads, or not at all; climate control system usage patterns —including mode, temperature setting versus ambient, and fan speed; infotainment system usage patterns, including radio station selection; navigation information—including origin/destination pair, whether navigation system is used for instructions or not; and departure & return times for a trip.

It has been observed, and confirmed through data analysis, that individual drivers tend to exhibit consistent longitudinal behavior patterns in their driving style. By quantifying and analyzing the behaviors listed above, individual drivers from a group of known drivers can be identified with great accuracy.

Figure 3A:
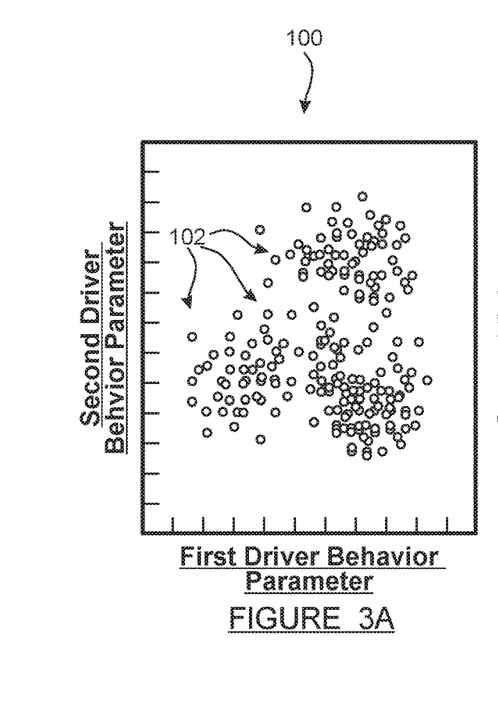
FIGS. 3A/B/C are data cluster diagrams which illustrate in two dimensions how driver behavior data can be grouped into driver-specific clusters based on proximity.
Figure 3B:
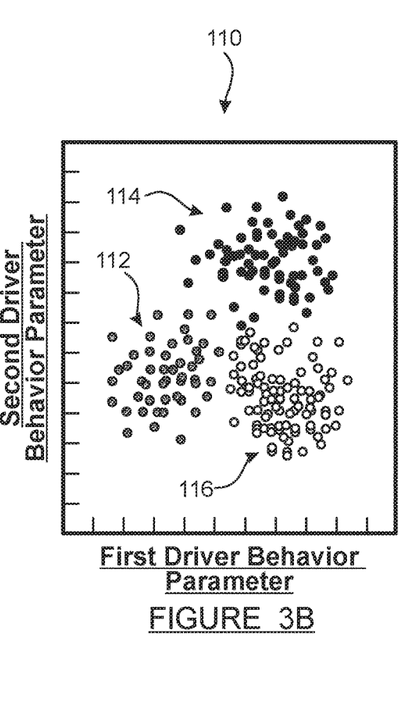
Figure 3C:
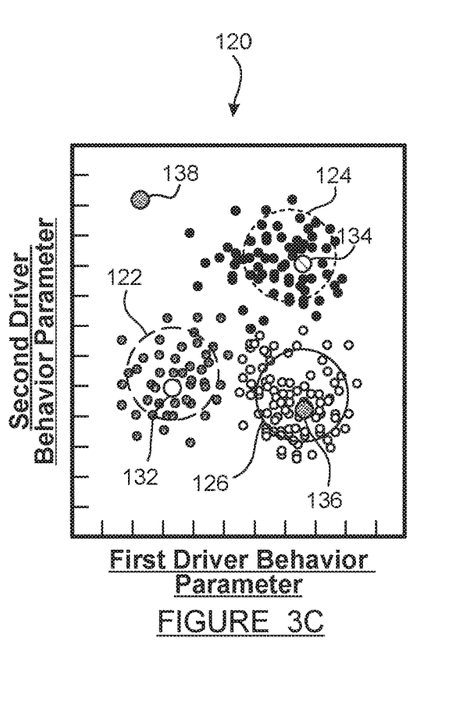

FIGS. 3A/B/C are data cluster diagrams showing how driver behavior data can be grouped into driver-specific clusters based on proximity. The data cluster diagrams in FIGS. 3A/B/C illustrate in two dimensions a mathematical relationship which can be analyzed in multiple dimensions.

In FIG. 3A, a diagram 100 charts the relationship between a first driver behavior parameter on the horizontal axis and a second driver behavior parameter on the vertical axis. The diagram 100 includes many data points 102, where each data point 102 represents one driver measurement sample. For example, the horizontal axis may measure speed deviation from speed limit (plus or minus), and the vertical axis may measure maximum vehicle acceleration. Then, for each driving trip, or for a portion of a driving trip, a data point is added to the collection of data used in the diagram 100 based on the driver's exhibited speed and acceleration behavior.

In FIG. 3B, a diagram 110 includes the same data as in the diagram 100, but the data points have now been associated with driver-specific clusters, in a manner that will be discussed in detail below. A cluster of points 112 are associated with a first driver who tends to drive below the speed limit (to the left end of the horizontal speed axis), and who tends to use moderately low acceleration (slightly below middle on the vertical axis). Similarly, a cluster of points 114 are associated with a second driver who drives faster than the speed limit and accelerates hard. A cluster of points 116 are associated with a third driver who drives faster than the speed limit, but does not accelerate particularly aggressively.

In FIG. 3C, a diagram 120 includes the same three clusters of points 112/114/116, and circles have been added which specify the center of each cluster and a distance from the center. For example, the cluster of points 112 has a circle 122 about its center, where the circle 122 may be drawn at a distance of two standard deviations from the center ($2\sigma$ radius around the mean). Likewise, the cluster of points 114 has a circle 124 identifying a $2\sigma$ radius from the mean, and the cluster of points 116 has a circle 126 identifying a $2\sigma$ radius from the mean. Assuming drivers behave as Gaussian, all data points from the driver will be inside this circle ($2\sigma$ radius from the mean) with 95% confidence. However, as would be understood by those skilled in this art of technology, the value of $2\sigma$ radius is purely illustrative. In the practice of real system design and implementation, this value of circle radius could be adjusted based on the requirements of targeted applications.

All of the elements on the diagrams 100/110/120 described thus far are captured during a learning mode of the system. That is, many of the points 102 are recorded, the clusters are defined, and the statistical bounds of each cluster are calculated. Then, when the system is applied for driver identification, a new data point is measured (or perhaps several during the driving trip), and the new data point is compared to the clusters to identify the driver. For example, a new data point 132 falls well within the circle 122 for the cluster of points 112, and so the new data point 132 is very likely to correspond to the driver associated with the cluster of points 112 (the first driver described above). Likewise, a new data point 134 corresponds to the second driver described above (cluster of points 114), and a new data point 136 corresponds to the third driver described above (cluster of points 116).

The diagram 120 also includes a new data point 138 which does not fall within any of the circles 122/124/126. The driver associated with the data point 138 would have to be classified as an unknown driver, as it is not within two standard deviations (or other criteria) of any cluster center.

The data cluster diagrams 100/110/120 show how a driver can be identified by comparing his or her measured behavior, as contained in two parameters, to the behavior of three known drivers. This concept can be applied to the many driver behavior parameters listed previously in one of two ways; either many different two-parameter cluster analyses can be performed, or the cluster analysis can be extended to multiple parameter dimensions. Following is a discussion of a generalized approach to comparing measured driver behavior as contained in multiple parameters against parameter data for a set of known drivers. This approach consists of two parts; first, a baseline set of data points for the known drivers are used to create data point clusters, as in FIGS. 3A and B above; second, measured data for a driver are used to identify the driver as being one of the known drivers or an unknown driver, as in FIG. 3C.

Figure 4:
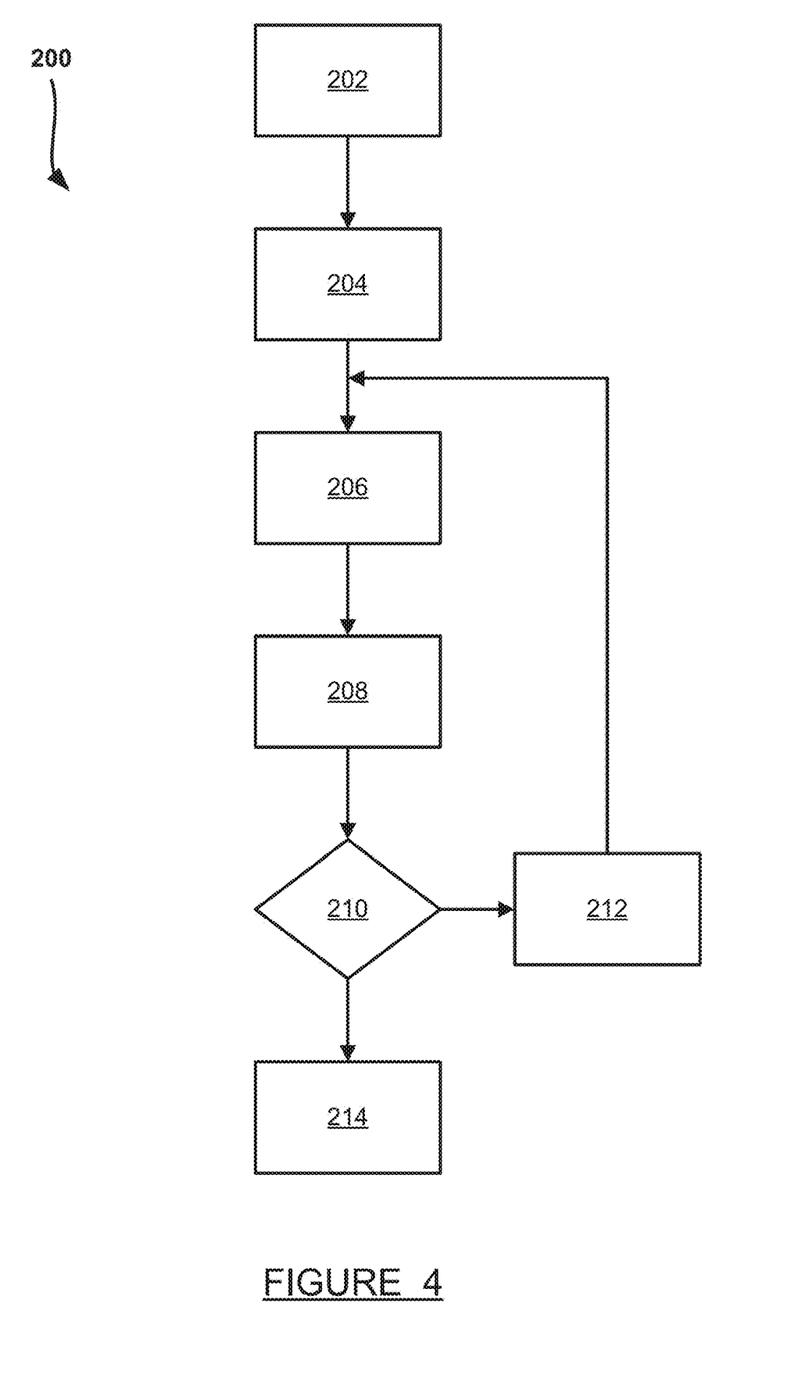
FIG. 4 is a flowchart diagram of a method for clustering driver behavior data in the manner illustrated in FIG. 3.

FIG. 4 is a flowchart diagram 200 of a method for clustering driver behavior data in the manner illustrated in FIG. 3. The method of the flowchart diagram 200 is the first part of the two part process described above, and is used to create behavior data clusters for a group of known drivers, such that the data clusters can subsequently be compared to measured driver data to identify a driver in the second part of the process.

At box 202, a suitable number of driver behavior parameter data points are provided. The number of data points may be one the order of 100, to provide a sufficient baseline for creating the clusters. The data points described in the present discussion may be start-up sequence data, such as elapsed time to door close or ignition switch usage, or longitudinal behavior data, such a speed, cornering accelerations, maximum braking g-force, etc. The data points may preferably be normalized—for example so that all normalized parameters fall in a range of 0-1—to eliminate the skewing effect of differering units and value ranges for the different parameters. The data points may be two-dimensional data points, or n-dimensional data parameter vectors, as discussed below. The term "data points" is used for convenience, even though this may refer to a multi-element vector rather than a two-dimensional point.

At box 204, a number k of clusters are defined, with each cluster j having a center or mean $\bar{X}_j$ in the n-dimensional space, where n is the number of parameters being considered. In a supervised clustering process, the value of k (the number of clusters) must be known in advance. This is not a problematic requirement for the purpose of driver identification, as a common scenario is vehicle sharing among a family where, for example, the number of drivers in the family (and hence the value of k) is a known number such as two, three or four. An unsupervised clustering process could also be used, where the value of k is adaptively learned as the data clusters are formed.

At box 206, each point (or vector) is assigned to the nearest cluster center, where the distance between a data vector and a cluster center in the n-dimensional space is calculated using an equation of the form:

$$D(a, b) = \sqrt{\sum_{i=1}^{n} W_i (a_i - b_i)^2}, \quad (1)$$

where D is the distance between the vectors a and b, $a_i$ and $b_i$ are individual parameter values in the vectors a and b, n is the number of dimensions in the vectors, and $w_i$ is an optional weighting factor for each parameter i in the vector. Equation (1) is written generically in terms of a and b. In practice, a can be replaced with the data vector being evaluated, and b can be replaced with one of the cluster centers $\vec{X}_j$.

At box 208, a new cluster mean $\vec{X}'_j$ is calculated for each of the k clusters. Each cluster j will have a new mean if it had new points assigned to it. At decision diamond 210, it is determined whether the distance between each of the previous cluster means $\vec{X}_j$ and the respective new cluster mean $\vec{X}'_j$ is less than a predetermined threshold ε. That is, whether:

$$|\vec{X}_j - \vec{X}'_j| < \varepsilon. \quad (2)$$

The purpose of the test at the decision diamond 210 is to determine whether the clustering process has converged. If the cluster centers continue to move substantially after each iteration of point assignment, then the process has not converged. When the cluster centers do not move appreciably from one iteration to the next, then the process has converged. The value of ε can be established to achieve a suitable degree of convergence without excessive computation.

If the distance between any of the previous cluster means $\vec{X}_j$ and the respective new cluster mean $\vec{X}'_j$ is not less than the predetermined threshold at the decision diamond 210, then at box 212 the new cluster mean $\vec{X}'_j$ is used as the cluster mean $\vec{X}_j$ and the process returns to the box 206 where each point (vector) is again assigned to the nearest cluster center based on the new values of the cluster mean(s) $\vec{X}_j$.

If the distance between each of the previous cluster means $\vec{X}_j$ and the respective new cluster mean $\vec{X}'_j$ is less than the predetermined threshold ε at the decision diamond 210, then the clustering has converged and at box 214 the k clusters are provided as output.

Figure 5:
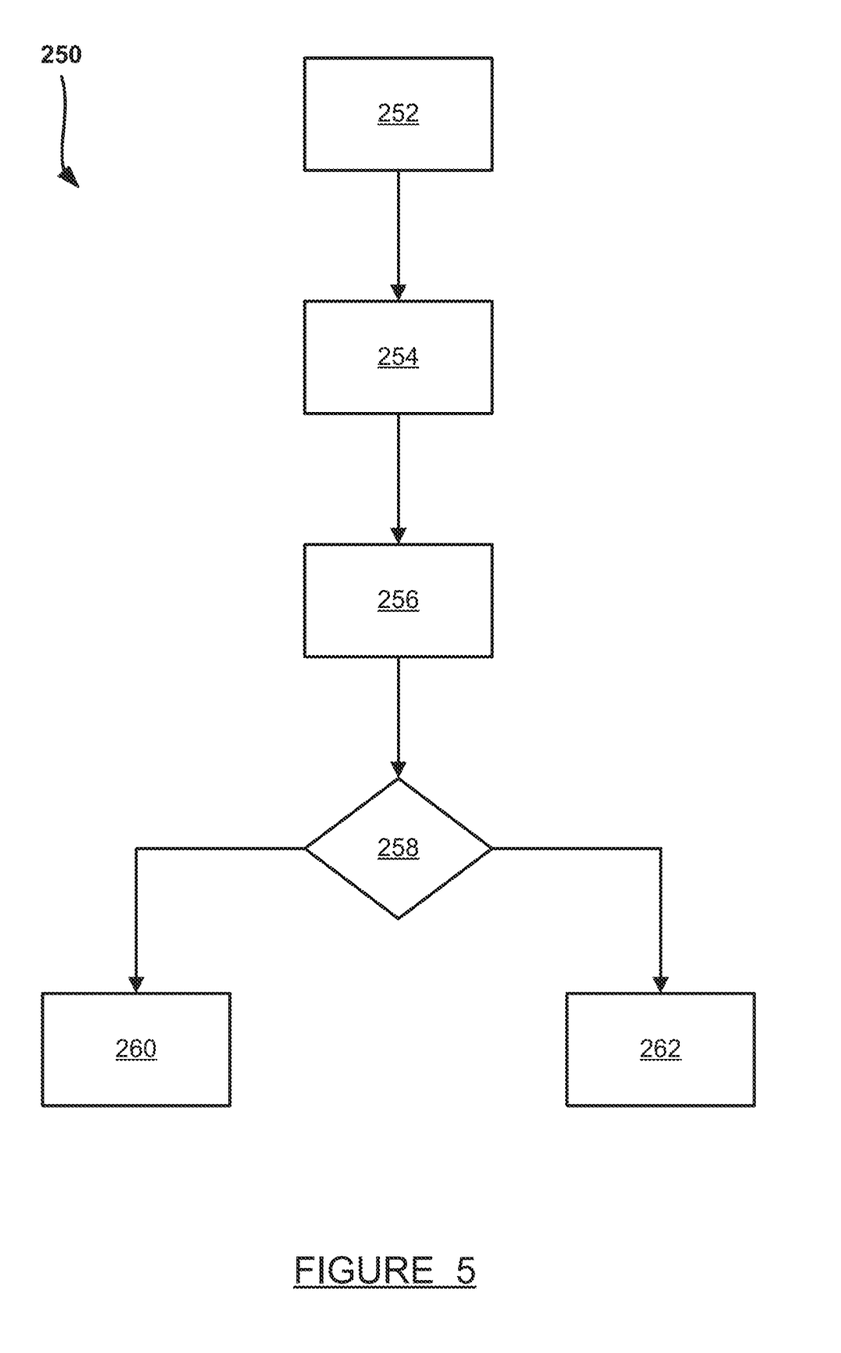
FIG. 5 is a flowchart diagram of a method for identifying a driver by comparing the driver's behavior data patterns with the data clusters described with reference to FIGS. 3 and 4.

FIG. 5 is a flowchart diagram 250 of a method for identifying a driver by comparing the driver's behavior data patterns with the data clusters described with reference to FIGS. 3 and 4. The method of the flowchart diagram 250 is the second part of the two part process described above, and is used to identify a driver by comparing measured driver data to the clusters created in the first part of the process.

At box 252, a data vector $\vec{Y}$ is provided which contains measured parameter data for a driver who is to be identified. The vector $\vec{Y}$ may contain start-up sequence event data measured after just a few seconds of the driver's presence in the vehicle, or the vector $\vec{Y}$ may contain longitudinal behavior parameter data measured after several minutes of driving. The vector $\vec{Y}$ may contain both start-up sequence event data and longitudinal behavior parameter data. At box 254, the vector $\vec{Y}$ is normalized as described above, so that it can be evaluated against the previously-computed clusters.

At box 256, the distance from the vector $\vec{Y}$ to each of the k cluster centers $\vec{X}_j$ is calculated, and the cluster center with the minimum distance to the vector $\vec{Y}$ is selected. Distance is calculated as described above in Equation (1). A value n is used to identify the closest of the cluster centers $\vec{X}_j$. That is:

$$n = \operatorname{argmin}_j |\vec{Y} - \vec{X}_j|. \quad (3)$$

For example, if the vector $\vec{Y}$ is closest to the center of cluster number 1 ($\vec{X}_1$), the value of n=1. Then, at decision diamond 258, it is determined whether the distance from the vector $\vec{Y}$ to the closest cluster center $\vec{X}_n$ is within two standard deviations. Distance is again calculated as described above in Equation (1). That is:

$$\operatorname{dist}|\vec{Y} - \vec{X}_n| < 2\sigma_n. \quad (4)$$

Here again, the value of 2σ (two standard deviations) radius is purely illustrative. Other radii could be used as deemed appropriate.

If the distance from the vector $\vec{Y}$ to the closest cluster center $\vec{X}_n$ is within two standard deviations, then at box 260 the driver associated with the current measurement vector $\vec{Y}$ is identified as driver n. For example, referring back to FIG. 3C, if the new data point 132 is the vector $\vec{Y}$, and the circle 122 is cluster number 1 (j=1) with cluster center $\vec{X}_1$, it is apparent that $\vec{Y}$ is within 2σ of $\vec{X}_1$, and it then follows that n=1 and the driver who exhibited the behavior vector $\vec{Y}$ is driver number 1.

If, at the decision diamond 258, the distance from the vector $\vec{Y}$ to the closest cluster center $\vec{X}_n$ is greater than two standard deviations, then at box 262 the driver associated with the current measurement vector $\vec{Y}$ is determined to be an unknown driver—that is, not a driver associated with any of the existing data clusters.

Various techniques can be used to combine and weight the start-up sequence data and the longitudinal behavior data in order to optimize driver identification accuracy. The simplest technique is to equally weight all data parameters, and use both the start-up sequence data and the longitudinal driving behavior data to determine driver identity. It is also possible to use only one or the other of the start-up sequence data and the longitudinal driving behavior data to determine driver identity. In addition, testing has shown very good results when using both the start-up sequence data and the longitudinal driving behavior data, with a weighting bias toward the start-up sequence data, to determine driver identity. Finally, individual parameter weighting can be used within evaluations of the start-up sequence data and the longitudinal driving behavior data, as described above with reference to Equation (1).

After a driver is identified using the methods described above, the driver identity can be used to configure various systems in the vehicle—such as the infotainment system— as described previously. Also, after determining the driver, the infotainment system might show the favorite places of the driver (e.g. restaurants, bars, spa centers) nearby. Since these places will differ for different drivers, the system configuration could provide useful information to each driver without burdening the driver with irrelevant information or messages. Each time the vehicle is driven and data is collected and used for driver identification, the newly collected data vector can be added to one of the clusters to further strengthen the baseline data for the particular driver.

As will be well understood by those skilled in the art, the several and various steps and processes discussed herein to describe the invention may be referring to operations performed by the processor 20, another computer, processor or other electronic calculating device that manipulates and/or transforms data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The driver identification system described above provides improved driver identification for configuration of onboard systems and components, while requiring no additional hardware or sensors in the vehicle. Fast and accurate driver identification improves the comfort and convenience of the driver, and also creates a cockpit environment in which the driver's attentiveness and performance are optimized.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining an identity of a driver of a vehicle based on driver behaviors, said method comprising:
    providing data from a plurality of sensors in the vehicle and a vehicle data bus;
    analyzing the data, using a processor, to determine the identity of the driver, including analyzing a sequence and timing of vehicle start-up events which begins when the driver opens a driver's door and ends when the vehicle starts moving, and analyzing a plurality of driver behavior parameters which are measured during driving of the vehicle, wherein analyzing the data includes:
        clustering data from a plurality of previous driving trips into a number of data clusters representing known drivers of the vehicle, wherein clustering data from a plurality of previous driving trips includes:
            providing data vectors containing a plurality of data parameters from the plurality of previous driving trips;
            defining the number of data clusters;
            assigning the data vectors to one of the data clusters, where each of the data vectors is assigned to a data cluster having a nearest center based on a weighted distance calculation.
            calculating new centers for the data clusters and re-assigning the data vectors to one of the data clusters if the new center of any of the data clusters is more than a threshold distance from a previous center; and
            providing the data clusters for the known drivers of the vehicle; and
    comparing data from a current driving trip to the data clusters to determine the identity of the driver; and
    configuring systems and components in the vehicle based on the identity of the driver.

2. The method of claim 1 wherein comparing data from a current driving trip to the data clusters includes:
    providing a new data vector containing a plurality of data parameters from the current driving trip;
    calculating a distance from the new data vector to a center of each of the data clusters;
    selecting a target data cluster as the data cluster whose center is the smallest distance from the new data vector;
    determining that the driver of the vehicle is one of the known drivers associated with the target data cluster if a distance from the new data vector to the center of the target data cluster is less than or equal to a predefined multiple of standard deviations; and
    determining that the driver of the vehicle is unknown if the distance from the new data vector to the center of the target data cluster is greater than the predefined multiple of standard deviations.

3. The method of claim 2 wherein the new data vector and the data clusters include data from the sequence and timing of vehicle start-up events, or the driver behavior parameters, or both.

4. The method of claim 1 wherein the data vectors are normalized before being assigned to the data clusters, such that each of the data parameters has a normalized value between zero and one which is representative of an actual value relative to a range.

5. The method of claim 1 wherein the sequence of vehicle start-up events includes driver's door opening, driver's door closing, ignition switch usage, driver's seat belt fastening, mirror and seat adjustment, transmission gear shifting, release of brakes and gas pedal usage.

6. The method of claim 1 wherein the plurality of driver behavior parameters includes average speed as a function of road type; deviation from speed limit; acceleration patterns, including maximum acceleration and number and frequency of accelerations greater than a first threshold g-level; braking patterns, including maximum deceleration and number and frequency of decelerations greater than a second threshold g-level; stop sign behavior, including whether a complete stop is made, and duration of stop; turn behavior, including speed and lateral acceleration during turns; yield pattern, including tendency to yield to other drivers or assert the right of way; cruise control usage pattern—including whether cruise control is used on highways, on other roads, or not at all; climate control system usage patterns—including mode, temperature setting versus ambient, and fan speed; infotainment system usage patterns, including radio station selection; navigation information—including origin/destination pair, whether navigation system is used for instructions or not; and departure & return times for a trip.

7. The method of claim 1 wherein analyzing the data includes applying a different weighting factor to the sequence and timing of vehicle start-up events than the driver behavior parameters.

8. A system for determining an identity of a driver of a vehicle based on driver behaviors, said system comprising:
    a plurality of sensors in the vehicle, said sensors providing data from systems and components in the vehicle; and a processor in communication with the plurality of sensors and a vehicle data bus, said processor being configured with an algorithm which analyzes the data from the sensors and the data bus to determine the identity of the driver, wherein the algorithm clusters data from a plurality of previous driving trips into a number of data clusters representing known drivers of the vehicle by:

providing data vectors containing a plurality of data parameters from the plurality of previous driving trips;

defining the number of data clusters;

assigning the data vectors to one of the data clusters, where each of the data vectors is assigned to a data cluster having a nearest center based on a weighted distance calculation;

calculating new centers for the data clusters and re-assigning the data vectors to one of the data clusters if the new center of any of the data clusters is more than a threshold distance from a previous center; and providing the data clusters for the known drivers of the vehicle, wherein the algorithm includes analyzing a sequence and timing of vehicle start-up events which begins when the driver opens a driver's door and ends when the vehicle starts moving, and analyzing a plurality of driver behavior parameters which are measured during driving of the vehicle, and wherein the processor configures systems and components in the vehicle based on the identity of the driver.

9. The system of claim 8 wherein the algorithm compares data from a current driving trip to the data clusters to determine the identity of the driver.

10. The system of claim 9 wherein the algorithm compares data from a current driving trip to the data clusters by:

providing a new data vector containing a plurality of data parameters from the current driving trip;

calculating a distance from the new data vector to a center of each of the data clusters;

selecting a target data cluster as the data cluster whose center is the smallest distance from the new data vector;

determining that the driver of the vehicle is one of the known drivers associated with the target data cluster if a distance from the new data vector to the center of the target data cluster is less than or equal to a predefined multiple of standard deviations; and determining that the driver of the vehicle is unknown if the distance from the new data vector to the center of the target data cluster is greater than the predefined multiple of standard deviations.

11. The system of claim 8 wherein the sequence and timing of vehicle start-up events includes driver's door opening, driver's door closing, ignition switch usage, driver's seat belt fastening, mirror and seat adjustment, transmission gear shifting, release of brakes and gas pedal usage.

12. The system of claim 8 wherein the plurality of driver behavior parameters includes average speed as a function of road type; deviation from speed limit; acceleration patterns, including maximum acceleration and number and frequency of accelerations greater than a first threshold g-level; braking patterns, including maximum deceleration and number and frequency of decelerations greater than a second threshold g-level; stop sign behavior, including whether a complete stop is made, and duration of stop; turn behavior, including speed and lateral acceleration during turns; yield pattern, including tendency to yield to other drivers or assert the right of way; cruise control usage pattern—ncluding whether cruise control is used on highways, on other roads, or not at all; climate control system usage patterns—including mode, temperature setting versus ambient, and fan speed; infotainment system usage patterns, including radio station selection; navigation information—including origin/destination pair, whether navigation system is used for instructions or not; and departure & return times for a trip.

13. A method for determining an identity of a driver of a vehicle based on driver behaviors, said method comprising:

providing data from a plurality of sensors in the vehicle and a vehicle data bus;

analyzing the data, using a processor, to determine the identity of the driver, including analyzing a sequence and timing of vehicle start-up events which begins when the driver opens a driver's door and ends when the vehicle starts moving;

analyzing a plurality of driver behavior parameters which are measured during driving of the vehicle, wherein analyzing the data includes clustering data from a plurality of previous driving trips into a number of data clusters representing known drivers of the vehicle, wherein clustering data from a plurality of previous driving trips includes:

providing data vectors containing a plurality of data parameters from the plurality of previous driving trips;

defining the number of data clusters;

assigning the data vectors to one of the data clusters, where each of the data vectors is assigned to a data cluster having a nearest center based on a weighted distance calculation;

calculating new centers for the data clusters and re-assigning the data vectors to one of the data clusters if the new center of any of the data clusters is more than a threshold distance from a previous center; and providing the data clusters for the known drivers of the vehicle;

comparing data from a current driving trip to the data clusters to determine the identity of the driver, and wherein the sequence of vehicle start-up events includes driver's door opening, driver's door closing, ignition switch usage, driver's seat belt fastening, mirror and seat adjustment, transmission gear shifting, release of brakes and gas pedal usage; and configuring systems and components in the vehicle based on the identity of the driver.

14. The method of claim 13 wherein comparing data from a current driving trip to the data clusters includes:

providing a new data vector containing a plurality of data parameters from the current driving trip;

calculating a distance from the new data vector to a center of each of the data clusters;

selecting a target data cluster as the data cluster whose center is the smallest distance from the new data vector;

determining that the driver of the vehicle is one of the known drivers associated with the target data cluster if a distance from the new data vector to the center of the target data cluster is less than or equal to a predefined multiple of standard deviations; and determining that the driver of the vehicle is unknown if the distance from the new data vector to the center of the target data cluster is greater than the predefined multiple of standard deviations.

15. The method of claim 13 wherein analyzing the data includes applying a different weighting factor to the sequence and timing of vehicle start-up events than the driver behavior parameters.

* * * * *

UNITED STATES PATENT AND TRADEMARK OFFICE
CERTIFICATE OF CORRECTION

| | |
|---|---|
| PATENT NO. | : 10,332,020 B2 |
| APPLICATION NO. | : 15/284187 |
| DATED | : June 25, 2019 |
| INVENTOR(S) | : Bai et al. |

Page 1 of 1

It is certified that error appears in the above-identified patent and that said Letters Patent is hereby corrected as shown below:

In the Specification

Column 1, Line 7: Insert:
--GOVERNMENT CLAUSE
This invention was made with government support under 1329939 awarded by the National Science Foundation. The Government has certain rights in this invention.--

Signed and Sealed this
Twenty-second Day of October, 2024

Katherine Kelly Vidal
*Director of the United States Patent and Trademark Office*